United States Patent
Cook (10) Patent No.: US 10,349,578 B2
(45) Date of Patent: Jul. 16, 2019

(54) COMBINATION FLEX AND RIGID HEADER HEIGHT CONTROL IN A HARVESTER

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/434,828

(22) Filed: Feb. 16, 2017

(65) Prior Publication Data

US 2018/0228086 A1 Aug. 16, 2018

(51) Int. Cl.
| | |
|---|---|
| *A01D 41/127* | (2006.01) |
| *A01D 34/00* | (2006.01) |
| *A01D 34/24* | (2006.01) |
| *A01D 34/28* | (2006.01) |
| *A01D 41/14* | (2006.01) |
| *A01D 34/04* | (2006.01) |
| *A01D 34/14* | (2006.01) |

(52) U.S. Cl.
CPC ......... *A01D 41/127* (2013.01); *A01D 34/006* (2013.01); *A01D 34/243* (2013.01); *A01D 34/28* (2013.01); *A01D 41/141* (2013.01); *A01D 34/04* (2013.01); *A01D 34/14* (2013.01)

(58) Field of Classification Search
CPC ... A01D 41/141; A01D 41/145; A01D 75/287
USPC ............... 56/10.2 E, 208, DIG. 15, 10.2 R
See application file for complete search history.

(56) References Cited

U.S. PATENT DOCUMENTS

| | | | |
|---|---|---|---|
| 3,886,718 A | 6/1975 | Talbot | |
| 4,009,555 A | 3/1977 | Temple | |
| 4,124,970 A * | 11/1978 | Bernhardt | A01D 41/141 56/10.2 E |
| 4,204,383 A * | 5/1980 | Milliken, Jr. | A01D 41/141 56/10.2 E |
| 4,332,126 A * | 6/1982 | Van Auwelaer | A01D 41/141 56/10.2 R |
| 4,573,308 A * | 3/1986 | Ehrecke | A01D 41/14 56/14.4 |
| 4,594,840 A | 6/1986 | D'Almeida et al. | |
| 4,641,490 A | 2/1987 | Wynn et al. | |
| 4,776,153 A | 10/1988 | DePauw et al. | |
| 5,713,190 A * | 2/1998 | Vermeulen | A01D 41/141 56/10.2 E |
| 6,758,029 B2 | 7/2004 | Beaujot | |
| 7,222,474 B2 | 5/2007 | Rayfield et al. | |

(Continued)

FOREIGN PATENT DOCUMENTS

EP 0765594 A1 4/1997

OTHER PUBLICATIONS

European Search Report for European Application No. 18156361.0, dated May 4, 2018 (7 pages).

*Primary Examiner* — Arpad Fabian-Kovacs
(74) *Attorney, Agent, or Firm* — Peter K. Zacharias; Patrick M. Sheldrake (57) ABSTRACT

A combination flex and rigid control system for a header of an agricultural harvester includes ground proximity detection arrangements for both rigid mode and flex mode operation of the header. The ground proximity detection arrangements are each coupled to the same sensor shaft by way of a sensor arm that is moved by either of the ground proximity detection arrangements.

20 Claims, 5 Drawing Sheets

(56) References Cited

U.S. PATENT DOCUMENTS

| | | | | |
|---|---|---|---|---|
| 7,555,883 B2* | 7/2009 | Fackler | ............... | A01D 41/145 |
| | | | | 56/10.2 E |
| 7,647,753 B2* | 1/2010 | Schlipf | ............... | A01D 41/141 |
| | | | | 56/10.2 E |
| 7,707,811 B1 | 5/2010 | Strosser | | |
| 7,874,132 B2 | 1/2011 | Sauerwein | | |
| 7,877,976 B2* | 2/2011 | Honas | ................ | A01D 57/20 |
| | | | | 56/208 |
| 7,975,458 B1 | 7/2011 | Noll | | |
| 7,992,374 B1* | 8/2011 | Bich | ................ | A01D 41/141 |
| | | | | 56/208 |
| 8,146,335 B2* | 4/2012 | Vandeven | ........... | A01D 41/141 |
| | | | | 56/10.2 E |
| 8,201,388 B1* | 6/2012 | Vandeven | ........... | A01D 41/141 |
| | | | | 56/10.2 E |
| 8,857,141 B2 | 10/2014 | Honas et al. | | |
| 2006/0242935 A1* | 11/2006 | Rayfield | ............. | A01D 41/141 |
| | | | | 56/10.2 E |
| 2006/0248868 A1* | 11/2006 | Otto | ................... | A01D 41/141 |
| | | | | 56/10.2 E |
| 2009/0107094 A1* | 4/2009 | Bich | ................... | A01D 41/141 |
| | | | | 56/10.2 E |
| 2010/0077712 A1* | 4/2010 | Nathan | ............... | A01D 41/141 |
| | | | | 56/10.2 E |

\* cited by examiner

COMBINATION FLEX AND RIGID HEADER HEIGHT CONTROL IN A HARVESTER

BACKGROUND OF THE INVENTION

1. Field of the Invention

The present invention relates to agricultural harvesters, more specifically to systems for controlling the position of headers on harvesters, and still more specifically to ground proximity detection systems for headers operated in both fixed and rigid modes.

2. Description of the Related Art

An agricultural harvester known as a "combine" has been termed such because it combines multiple harvesting functions in a single harvesting unit, such as cutting or picking, threshing, separating and cleaning. A typical combine includes a header that removes the crop from a field, and a feeder housing that transports the crop matter into a threshing and cleaning section where the desirable grain is separated from the undesirable non-grain material. The cleaned grain is transported to an onboard grain storage tank or hopper, and non-grain crop material such as stalks, stems or leaves from the threshing and cleaning section proceeds through a residue system, which may utilize a chopper to process the non-grain material and direct it out the rear of the combine. When the onboard grain storage tank becomes full, the combine is positioned adjacent a vehicle into which the grain is to be unloaded, such as a semi-trailer, gravity box, straight truck, or the like; and an unloading system on the combine is actuated to transfer the grain into the vehicle.

In many agricultural harvesters the manner in which the header is deployed for use in harvesting a crop can be changed. For example, when harvesting some crops in some field conditions, it is desirable to position the header in a so-called rigid mode, with the header more or less rigid across the width of the machine and at a fixed orientation relative to the ground surface. Under other crop and/or field conditions it can be preferred to use a so-called flex mode header arrangement in which the header more or less floats over the field surface. On wide headers, sections across the width of the header can move somewhat independently relative to other sections, to move up or down, forward or back and/or tilt side to side in response to field surface conditions. Some harvesting heads for agricultural harvesters can be operated selectively in either the so-called rigid mode or in the so-called flex mode.

It is desirable to have ground-sensing systems for both rigid mode and flex mode operation so that the header can be adjusted as necessary when encountering field irregularities, obstacles or obstructions, elevational changes and the like. On headers that can be operated in both the rigid mode and the flex mode, it is known to provide two separate systems for header height control, one for cutting with the header riding on the ground in flex mode and one for cutting with the header operating off the ground in rigid mode. Having separate systems requires separate sensors, wires and some other system components. Changing between flex mode and rigid mode requires switching between the different sensing systems, and requires unplugging sensors for the mode being switched from and plugging into the sensors for the mode being switched to. Switching from one sensor system to the other sensor system also may require recalibrating the combine-header interface. While these tasks are not particularly difficult or burdensome individually, collectively they make the process of switching from one mode to the other mode more time-consuming, and the large number of steps required to switch from one mode to the other mode increase the opportunity for error if unplugging from one sensor or plugging into another sensor is overlooked inadvertently. Further, the act of plugging and unplugging sensors causes wear, thereby increasing the potential for failure.

Accordingly, what is needed in the art is a header height control system that can be operated in both rigid mode and flex mode header operation, without significant adjustment or change when switching from one header operating mode to the other header operating mode.

SUMMARY OF THE INVENTION

The combination flex and rigid header height control disclosed herein provides a single system with a single set of sensors that can be used in either flex mode operation or rigid mode operation.

In one form, the combination header height control provides a ground sensing system for a header in an agricultural harvester that can be optionally configured to operate in a floating flex mode configuration or in a fixed rigid mode configuration. The ground sensing system includes a controller/processor and a sensor having a communication link to the controller/processor. A flex mode ground detector is connected to the sensor for acquiring and conveying ground proximity information during flex mode operation; and a rigid mode ground detector is connected to the sensor for acquiring and conveying ground proximity information during a rigid mode operation.

In another form, the combination header height control provides a ground sensing system for a header in an agricultural harvester in which the header can be configured to operate in a floating flex mode configuration or in a fixed rigid mode configuration. The ground sensing system has a flex arm pivotally connected to the header and extending along the bottom of the header and an elongated feeler arm pivotally connected to the flex arm and extending away from the flex arm. A sensor arm is coupled to the feeler arm and to the flex arm, and a sensor shaft is coupled to and rotated by the sensor arm.

One advantage of the combination rigid and flex header height control disclosed herein is that switching between rigid and flex modes for harvester header height control is simplified and expedited.

Another advantage of the combination rigid and flex header height control disclosed herein is that potential wear is reduced by maintaining sensor connections when switching from one mode to the other mode.

Still another advantage of the combination rigid and flex header height control disclosed herein is that a single sensor operates in both flex mode and rigid mode.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
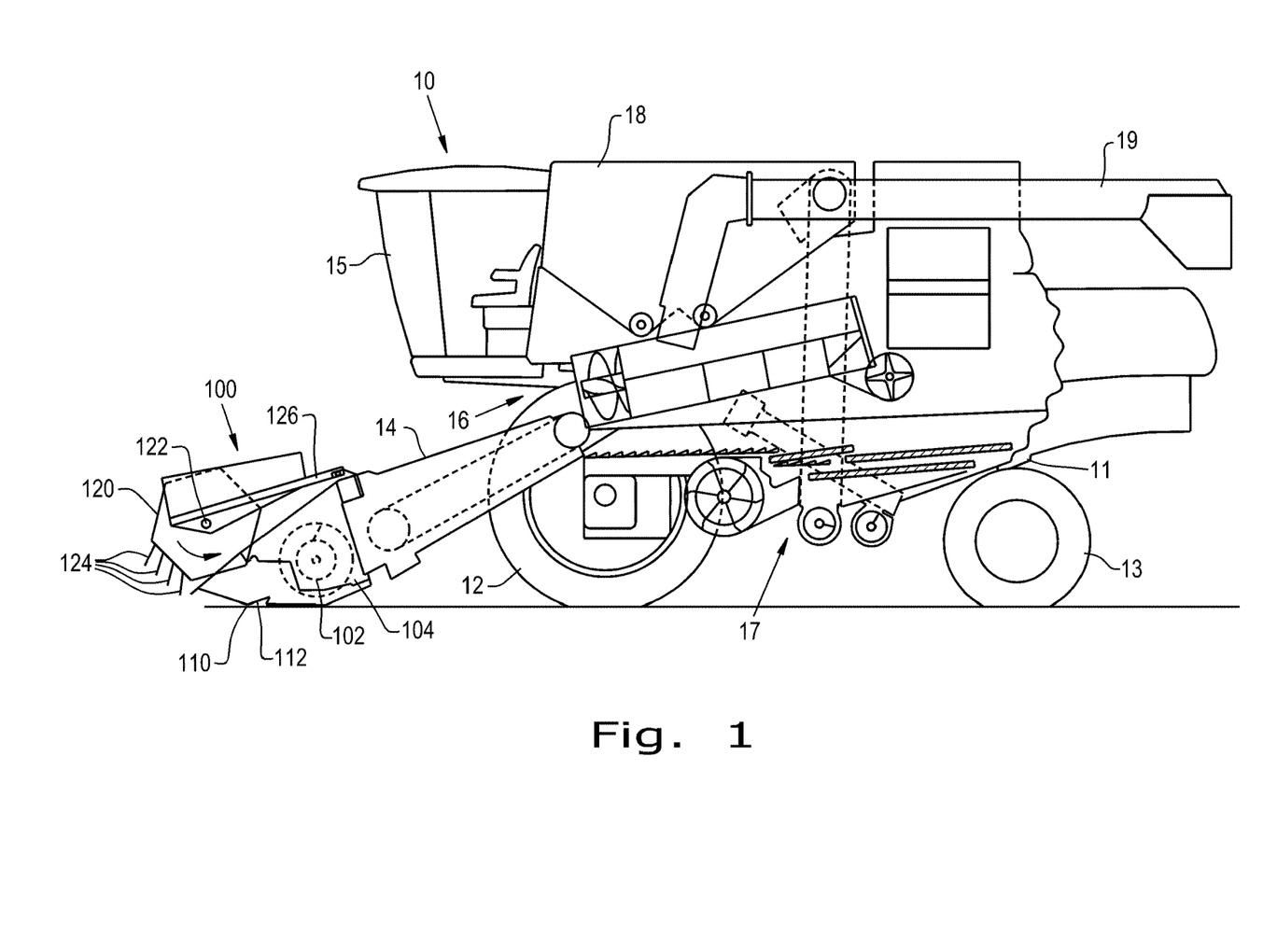
FIG. 1 is an elevational view of an agricultural harvester in which the combined flex and rigid header height control can be used.

Referring now to the drawings, and more particularly to FIG. 1, there is shown an exemplary embodiment of an agricultural harvester in the form of a combine 10 on which a combination flex and rigid header height control system 400 (FIGS. 2-5) can be used. Combine 10 generally includes a chassis 11, ground engaging wheels 12 and 13, a header 100, a feeder housing 14, an operator cab 15, a threshing and separating system 16, a cleaning system 17, a grain tank 18, and an unloading auger 19. Although the agricultural harvester is shown in the form of a combine harvester, it is also to be understood that the harvester can take other forms. For example, the harvester also can be in the form of other types of self-propelled harvesters with headers, such as self-propelled windrowers, forage harvesters, sugarcane harvesters, cotton pickers, etc.

The header 100 is mounted to the front of the combine 10 and includes a cutter bar 110, shown in FIG. 1 as a combination flexible and rigid cutter bar 110, for severing crops from a field during forward motion of combine 10. A rotatable reel 120 feeds the crop toward the cutter bar 110, and a double auger 102 feeds the severed crop laterally inwardly from each side toward feeder housing 14. Feeder housing 14 conveys the cut crop to threshing and separating system 16, and is selectively vertically movable using appropriate actuators, such as hydraulic cylinders (not shown). It should be understood that the general structures of header 100 also can take other forms. For example, instead of a double auger 102, one or more draper belts can be used.

The header 100 includes a header frame 104 which is carried by the chassis 11 and is coupled to both the cutter bar 110 and the reel 120. The cutter bar 110 is movably coupled to the header frame 104 by, for example, a pivotable cutter bar table 112, to enable the cutter bar 110 to move in an up/down direction.

The reel 120 rotates about an axis of rotation 122 and includes a plurality of tines 124 that will grab crop material and direct it toward the cutter bar 110 as the reel 120 rotates about reel axis of rotation 122. To adjust the relative positioning of the reel 120 relative to the header frame 104, the reel 120 is pivotably coupled to the header frame 104 by a reel arm 126 which carries the reel 120. In this sense, the reel arm 126 is pivotably coupled to the header frame 104 so forces acting on the reel arm 126 can cause the reel arm 126, and carried reel 120, to pivot.

It can be appreciated by those skilled in the art that the structures and systems of agricultural harvester 10 enable header 100 to be raised and lowered and/or tilted forward and back and/or tilted side to side to achieve the desired height and attitude for operating agricultural harvester 10 to harvest a crop. Header 100 also can be adjusted to a so-called flex mode header arrangement in which the cutter bar 110 follows the ground surface such that header 100 more or less floats over the field surface, or to a so-called rigid mode in which the header is more or less rigid across the width of the machine and at a fixed orientation relative to the ground surface. Combination flex and rigid control system 400 is provided as a ground sensing or awareness system while header 100 is operated in either flex mode or rigid mode.

Referring now more specifically to FIGS. 2-5, the combination flex and rigid control system 400 is shown on header 100 for sensing the proximity of the ground while header 100 is operating in either flex mode or rigid mode. System 400 includes a sensor having a sensor shaft 402 that communicates with a controller/processor 404 by way of a communication link 406, which can be a wired communication link or a wireless communication link. It should be understood that controller/processor 404 can be located in whole or in part in various locations on harvester 10, including in or near operator cab 15. A sensor arm 408 is engaged with sensor shaft 402 and extends generally downwardly away from sensor shaft 402. Sensor arm 408 can be secured to sensor shaft 402 by a fastener 410, such as a bolt, bolt and nut assembly, or the like; by welding or by other suitable attachment means. Force applied against sensor arm 408 is transmitted to sensor shaft 402, in the way of rotational force exerted against sensor shaft 402 by the lever formed by sensor arm 408, thereby causing rotation of sensor shaft 402. Sensor shaft 402 can include a potentiometer such as a strain gauge or other suitable sensing means, as those skilled in the art will understand readily, for determining when rotational force is applied against sensor shaft 402 sufficient to cause the movement thereof, and for transmitting the data and information about such force and movement to controller/processor 404.

Ground proximity detectors are provided coupled to sensor arm 408 for changing a position of sensor arm 408 in response to ground surface changes determined by the ground detectors. A flex mode ground detector is provided as a flex arm 412 pivotally mounted to header frame 104 about a pivotal connection 414. Flex arm 412 extends generally along the bottom of header frame 104 and is operatively coupled to sensor arm 408 so that upward and downward movements of flex arm 412 are conveyed to sensor arm 408. A rigid mode ground detector is provided as an elongated feeler arm 416 that is secured about a pivotal connection 418 also to flex arm 412. Feeler arm 416 is pivotal through a range of motion between an upper position generally aligned with flex arm 412 and a lower position in which feeler arm 416 extends angularly away from and beneath header 100. A pin 420 is optionally connectable to pin feeler arm 416 to flex arm 412 or to secure flex arm 412 relative to header frame 104.

It should be understood that several assemblies including one or more sensor shaft 402 with one or more sensor arm 408 connected thereto operated by one or more flex arm 412 and feeler arm 416 can be provided across the width of header 100, all connected to controller/processor 404.

Figure 2:
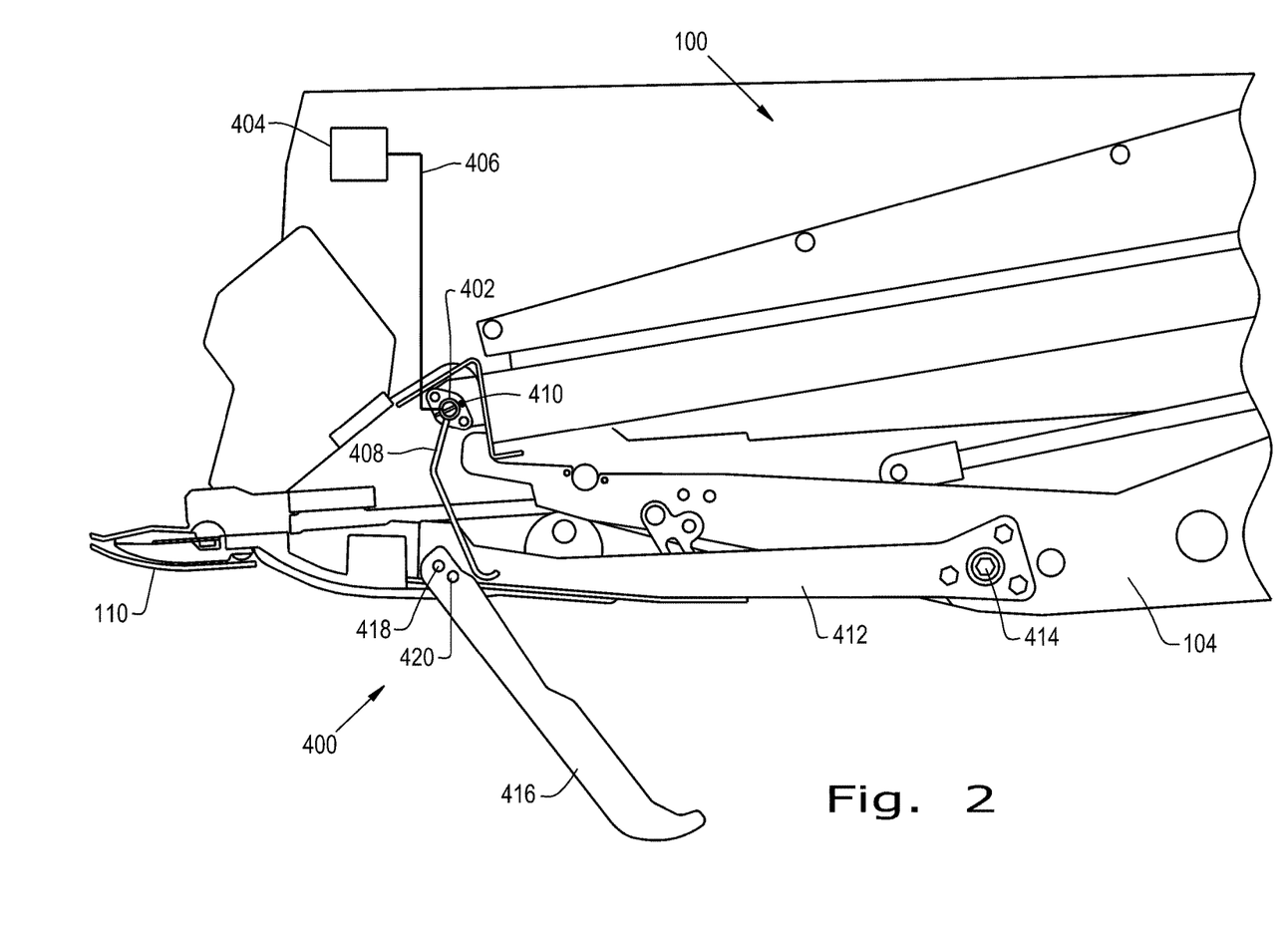
FIG. 2 is a side view of a combination flex and rigid control system as disclosed herein configured for flex mode operation at a high adjusted position

FIG. 2 illustrates header 100 and combination flex and rigid control system 400 adjusted to a flex mode of operation at a relatively high position. Feeler arm 416 is pinned to flex arm 412 by pin 420. Feeler arm 416 follows along the ground surface, and any upward or downward movements thereof are transmitted to flex arm 412 and sensor arm 408, and then to sensor shaft 402. Accordingly, ground sensing data is provided to controller/processor 404.

Figure 3:
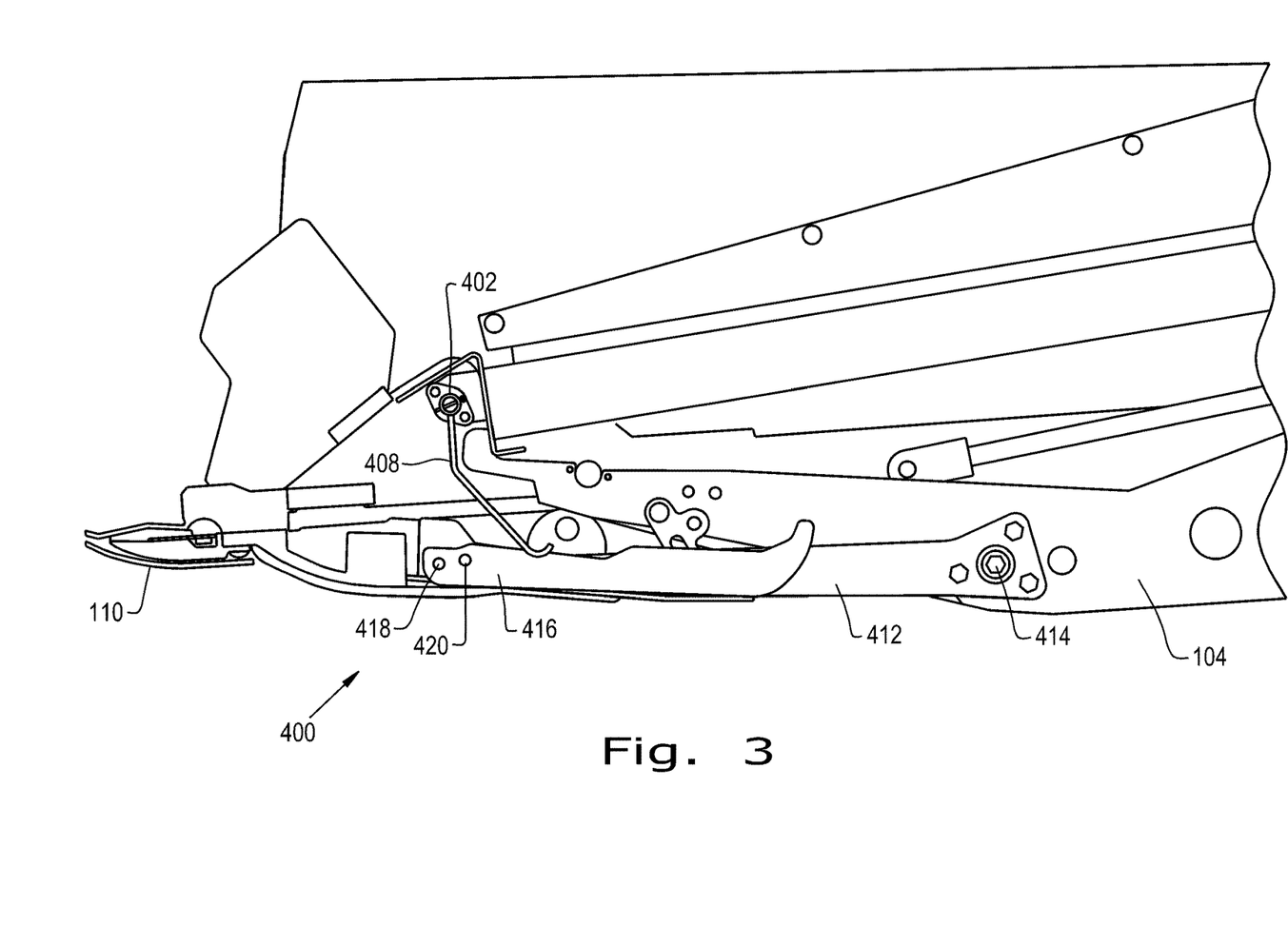
FIG. 3 is a side view of the combination flex and rigid control system as shown in FIG. 2, but positioned at a low adjusted position.

FIG. 3 illustrates header 100 and combination flex and rigid control system 400 adjusted to a flex mode of operation at a lower position. Feeler arm 416 is pinned to flex arm 412 by pin 420 and is at a more horizontal position. Feeler arm 416 and/or flex arm 412 follow along the ground surface and upward or downward movements thereof are transmitted to sensor arm 408 and then to sensor shaft 402. Accordingly, ground sensing data is provided to controller/processor 404.

Figure 4:
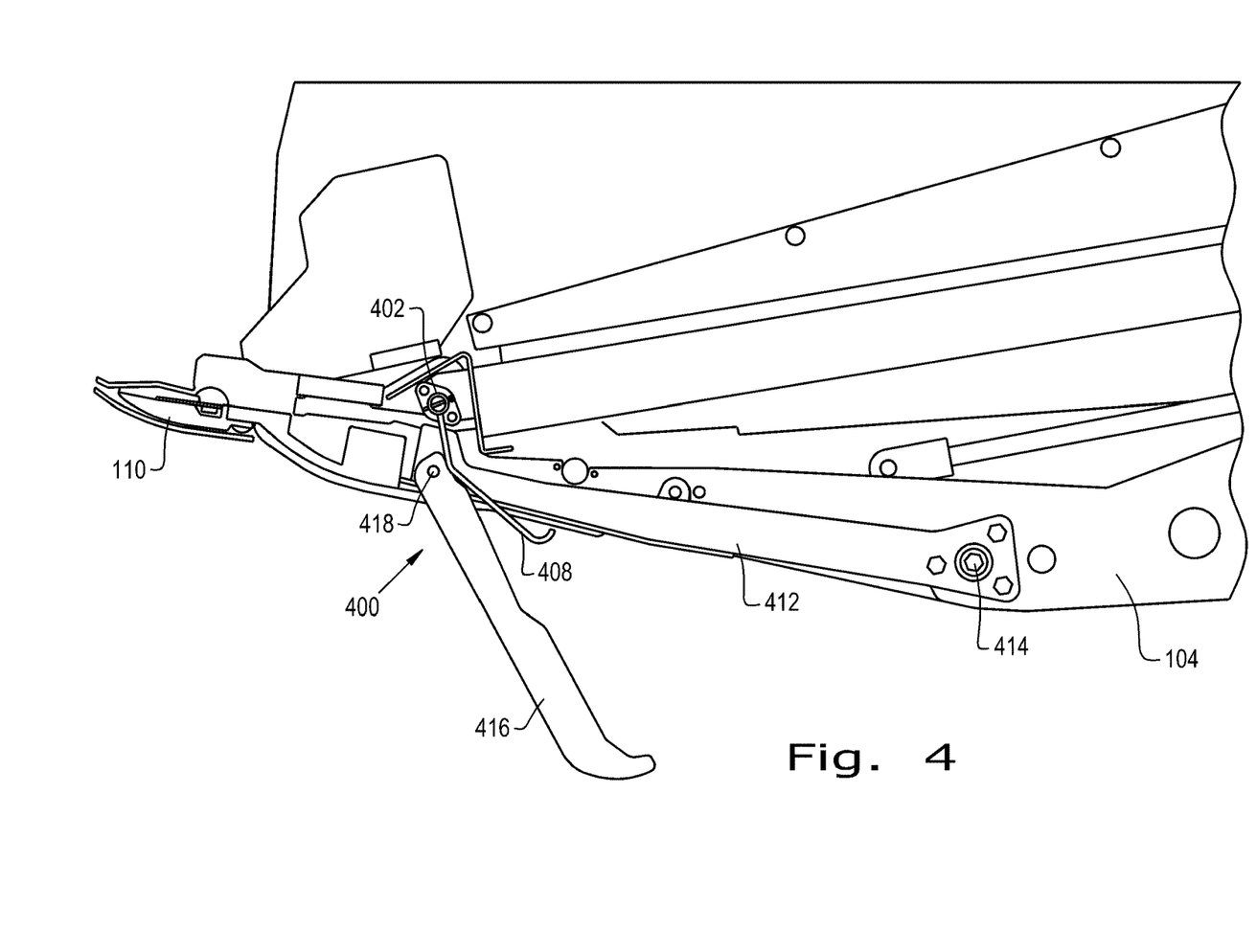
FIG. 4 is a side view of the combination flex and rigid control system shown in FIGS. 2 and 3, configured for rigid mode operation at a high adjusted position.

FIG. 4 illustrates header 100 and combination flex and rigid control system 400 adjusted to a rigid mode of operation at a high position. Flex arm 412 is retained in an upward position without being pinned, which may be by an actuator (not shown) or other suitable means. Feeler arm 416 is unpinned, and pin 420 can be stored on or away from header 100, a suitable storage opening therefore not being shown. Header 100 is carried well above the ground surface, and feeler arm 416 is pivoted fully downward generally away from sensor arm 408. Feeler arm 416 may be carried above the ground surface, only occasionally and intermittently engaging the ground surface due to ground surface undulations or operational changes causing feeler arm 416 to engage the ground surface. When feeler arm 416 is pivoted upward sufficiently, the movement thereof is transmitted to sensor arm 408, which in turn causes a positional change in sensor shaft 402. Accordingly, ground sensing data is provided to controller/processor 404.

Figure 5:
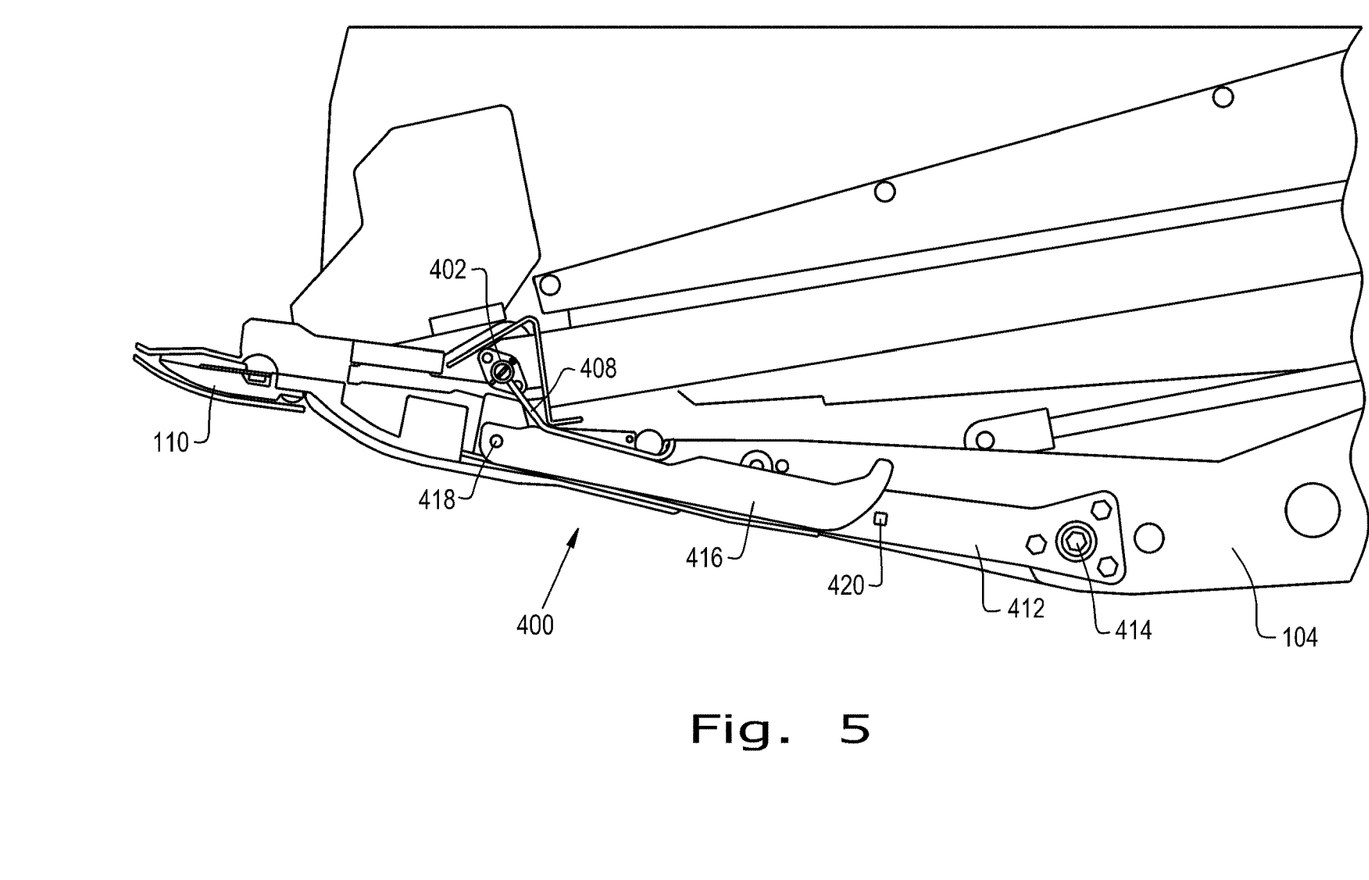
FIG. 5 is a side view of the combination flex and rigid control system as shown in FIG. 4, but positioned at a low adjusted position.

FIG. 5 illustrates header 100 and combination flex and rigid control system 400 adjusted to a rigid mode of operation at a low position. In this configuration, flex arm 412 is pinned to header frame 104 by pin 420. Since header 100 is carried near to the ground, feeler arm 416 is substantially continuously engaged with the ground surface and thereby is rotated upwardly, close to the underside of header 100 in the exemplary arrangement shown. Any further upward or downward movement of feeler arm 416 is transmitted to sensor arm 408, which in turn causes a positional change in sensor shaft 402. Accordingly, ground sensing data is provided to controller/processor 404.

It should be understood that other arrangements can be made to provide mechanical connection between a flex mode ground detector and a rigid mode ground detector so that each provides ground detected information to the same sensor and controller/processor. The flex mode ground detector and rigid mode ground detector can be mechanically coupled in various ways to operate as required. Further, the intermediate connection provided by sensor arm 408 can be accomplished in various ways, by coupling the sensor arm to each of the flex and rigid mode ground detectors or by coupling the sensor arm to one of the flex mode ground detector and the rigid mode ground detector, while the other of the ground detectors is mechanically coupled to the one directly coupled to the sensor arm, or remains uncoupled.

The combination flex and rigid control system described herein utilizes the same sensor system, including sensor shaft 402 and sensor arm 408 for operation in both flex mode and rigid mode. Accordingly, duplication is eliminated and sensor connections need not be changed when switching from one mode to the other mode. A same pin 420 can be used for pinning flex arm 412 to header frame 104 during rigid mode operation, and for pinning feeler arm 416 to flex arm 412 during a flex mode operation. Alternatively, pin 420 can be removed with neither flex arm 412 nor feeler arm 416 pinned to the other or to header frame 104. Conversion from one operating mode to another is easy and quick, even if pinning is done manually. However, it should be understood that various automated arrangements can be made to pin and unpin flex arm 412 and feeler arm 416.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A ground sensing system for a header in an agricultural harvester, the header configured to operate in a floating flex mode or in a fixed rigid mode, the ground sensing system comprising:
   a controller;
   a sensor having a communication link to the controller;
   a flex mode ground detector configured to be pivoted on the header, the flex mode ground detector operatively connected to the sensor and configured for acquiring and conveying ground proximity information during operation of the header in the flex mode; and
   a rigid mode ground detector pivoted on the flex mode ground detector, the rigid mode ground detector extending downwardly for contact with a ground surface and operatively connected to the sensor, the rigid mode ground detector configured for acquiring and conveying ground proximity information during operation of the header in the rigid mode.

2. The ground sensing system of claim 1, further comprising a sensor shaft coupled to the flex mode ground detector and to the rigid mode ground detector.

3. The ground sensing system of claim 1, wherein the rigid mode ground detector is fastened to the flex mode ground detector when the header is operating in the flex mode.

4. The ground sensing system of claim 3, further comprising a sensor shaft and sensor arm coupled to the flex mode ground detector.

5. The ground sensing system of claim 3, wherein the flex mode ground detector is in a fixed position when the header is operating in the rigid mode.

6. The ground sensing system of claim 5, further comprising a sensor shaft and a sensor arm coupled to the flex mode ground detector.

7. The ground sensing system of claim 1, wherein the flex mode ground detector is in a fixed position when the header is operating in the rigid mode.

8. The ground sensing system of claim 7, wherein the sensor includes a sensor shaft and a sensor arm coupled to the sensor shaft.

9. The ground sensing system of claim 1, wherein the rigid mode ground detector is fastened to said the flex mode ground detector when the header is operating in the flex mode.

10. The ground sensing system of claim 1, wherein the flex mode ground detector is fastened in a fixed position when the header is operating in the rigid mode.

11. The ground sensing system of claim 10, wherein the rigid mode ground detector is fastened to the flex mode ground detector when the header is operating in the flex mode.

12. A ground sensing system for a header in an agricultural harvester, the header having a frame and being configured to operate in a floating flex mode or in a fixed rigid mode, the ground sensing system comprising:
- a flex arm for pivotal connection to the header and extending along and adjacent a ground surface;
- an elongated feeler arm pivotally connected to the flex arm and extending angularly away from the flex arm below the flex arm for contact with the ground surface;
- a sensor arm operatively engaged by the feeler arm and the flex arm; and
- a sensor shaft coupled to and rotated by the sensor arm.

13. The ground sensing system of claim 12, wherein the elongated feeler arm is fixed to the flex arm when the header is configured to operate in the flex mode.

14. The ground sensing system of claim 13, wherein the flex arm is fastened in a fixed position when the header is configured to operate in the rigid mode.

15. The ground sensing system of claim 12, wherein the flex arm is fastened in a fixed position when the header is configured to operate in the rigid mode.

16. The ground sensing system of claim 13, further comprising a pin for selectably connecting the elongated feeler arm to the flex arm and the flex arm to the header frame.

17. The ground sensing system of claim 13, further comprising a controller, and a communication link between the controller and the sensor shaft.

18. A header for an agricultural harvester, the header comprising:
- a cutterbar;
- a frame supporting the cutterbar;
- a reel coupled to the frame; and
- a ground sensing system comprising:
  - a controller;
  - a sensor having a communication link to the controller; and
  - a flex mode ground detector pivotably coupled to the frame, the flex mode ground detector operatively connected to the sensor and configured for acquiring and conveying ground proximity information during operation of the header in a flex mode; and
  - a rigid mode ground detector pivoted on the flex mode ground detector, the rigid mode ground detector extending downwardly for contact with a ground surface and operatively connected to the sensor, the rigid mode ground detector configured for acquiring and conveying ground proximity information during operation of the header in a rigid mode.

19. The header of claim 18, wherein the ground sensing system further comprises a sensor shaft coupled to the flex mode ground detector and to the rigid mode ground detector.

20. The header of claim 18, wherein the rigid mode ground detector is fastened to the flex mode ground detector when the header is operating in the flex mode.

* * * * *